US009547573B2

(12) United States Patent
Leinonen et al.

(10) Patent No.: US 9,547,573 B2
(45) Date of Patent: Jan. 17, 2017

(54) SERIAL COMMUNICATION OVER COMMUNICATION CONTROL PIN

(71) Applicant: Nokia Corporation, Espoo (FI)

(72) Inventors: Pekka E. Leinonen, Turku (FI); Kai Inha, Jarvenpaa (FI); Timo T. Toivola, Turku (FI); Pekka Talmola, Turku (FI); Rune Lindholm, Sottunga (FI); Timo J. Toivanen, Mantsala (FI)

(73) Assignee: Nokia Technologies Oy, Espoo (FI)

( * ) Notice: Subject to any disclaimer, the term of this patent is extended or adjusted under 35 U.S.C. 154(b) by 451 days.

(21) Appl. No.: 14/051,012

(22) Filed: Oct. 10, 2013

(65) Prior Publication Data
US 2015/0106641 A1    Apr. 16, 2015

(51) Int. Cl.
G06F 3/00 (2006.01)
G06F 11/30 (2006.01)
G06F 13/40 (2006.01)
G06F 13/38 (2006.01)
G06F 13/00 (2006.01)

(52) U.S. Cl.
CPC ......... G06F 11/3027 (2013.01); G06F 13/382 (2013.01); G06F 13/4063 (2013.01)

(58) Field of Classification Search
CPC .................................. G06F 3/00; G06F 13/00
USPC ...................... 710/8–10, 104, 305
See application file for complete search history.

(56) References Cited

U.S. PATENT DOCUMENTS 5,295,843 A    3/1994   Davis et al.
5,835,791 A  * 11/1998   Goff ........................ G06F 3/023
                                                                    710/15
6,222,910 B1   4/2001   Price et al.
6,630,747 B1  10/2003   Kamada et al.
7,361,059 B2   4/2008   Harkabi et al.
7,387,539 B2   6/2008   Trenne
7,440,287 B1  10/2008   Ni et al.
7,493,437 B1   2/2009   Jones et al.
7,865,629 B1   1/2011   Tantos et al.
8,043,099 B1  10/2011   Ni et al.
(Continued)

FOREIGN PATENT DOCUMENTS

EP    1487081 A2   12/2004
EP    2264611 A1   12/2010
(Continued)

OTHER PUBLICATIONS

Universal Serial Bus 3.0 Specification.
(Continued)

Primary Examiner — Christopher Shin
(74) Attorney, Agent, or Firm — Mintz Levin Cohn Ferris Glovsky and Popeo, P.C.

(57) ABSTRACT

Methods and apparatus, including computer program products, are provided for serial communications over a communications control pin. The method may include detecting, by a first device including a data interface, a current flow at a first communication control pin at the data interface; and assigning, by the first device based on the detection of the current flow at the first communication control pin, serial data communication circuitry to a second communication control pin at the data interface to carry serial data communications to another device. Related apparatus, systems, methods, and articles are also described.

23 Claims, 5 Drawing Sheets

(56) References Cited

U.S. PATENT DOCUMENTS

| | | |
|---|---|---|
| 8,057,106 B1 | 11/2011 | Zhovnirovsky et al. |
| 8,882,524 B2 | 11/2014 | Golko et al. |
| 8,911,260 B2 | 12/2014 | Golko et al. |
| 2002/0049887 A1* | 4/2002 | Takahashi .............. G11O 5/063 |
| | | 711/115 |
| 2002/0169915 A1 | 11/2002 | Wu |
| 2003/0172318 A1* | 9/2003 | Sugita ..................... G06F 1/266 |
| | | 714/25 |
| 2006/0024997 A1 | 2/2006 | Teicher |
| 2006/0076977 A1 | 4/2006 | Zhu |
| 2007/0241769 A1 | 10/2007 | Song et al. |
| 2007/0243769 A1 | 10/2007 | Atsmon et al. |
| 2008/0076301 A1 | 3/2008 | Liu |
| 2008/0215765 A1 | 9/2008 | Butler et al. |
| 2011/0136381 A1 | 6/2011 | Cho |
| 2012/0159008 A1 | 6/2012 | Park et al. |
| 2012/0290761 A1* | 11/2012 | Chen ....................... G06F 13/42 |
| | | 710/305 |
| 2013/0080801 A1* | 3/2013 | Choi ....................... G06F 1/266 |
| | | 713/310 |
| 2013/0117470 A1 | 5/2013 | Terlizzi et al. |
| 2013/0305066 A1* | 11/2013 | Mullins .................. G06F 1/266 |
| | | 713/310 |
| 2014/0073188 A1 | 3/2014 | Fritchman et al. |
| 2014/0075069 A1* | 3/2014 | Mullins ............... H04M 1/0274 |
| | | 710/106 |
| 2014/0129740 A1* | 5/2014 | Wang ................... G06F 13/385 |
| | | 710/15 |
| 2014/0208134 A1* | 7/2014 | Waters .................... G06F 1/266 |
| | | 713/310 |
| 2014/0280960 A1 | 9/2014 | Paramasivam et al. |
| 2015/0255933 A1 | 9/2015 | Sung et al. |
| 2015/0356045 A1* | 12/2015 | Soffer ................. G06F 13/4221 |
| | | 710/303 |

FOREIGN PATENT DOCUMENTS

| | | |
|---|---|---|
| EP | 2381571 A2 | 10/2011 |
| EP | 2590274 A2 | 5/2013 |
| JP | 2002007010 A | 1/2002 |
| JP | 2002312085 A | 10/2002 |
| JP | 2006068396 A | 3/2006 |

OTHER PUBLICATIONS

Universal Serial Bus 3.1 Specification.

USB Battery Charging Specification V1.2 Compliance Plan, Revision 1.0, Oct. 12, 2011.

* cited by examiner

SERIAL COMMUNICATION OVER COMMUNICATION CONTROL PIN

FIELD

The subject matter described herein relates to connectors including devices used with for example the Universal Serial Bus (USB).

BACKGROUND

Physical connectors, such as the connector used with the Universal Serial Bus (USB), can be used to couple devices. USB standards define physical and electrical aspects of USB. Examples of those standards include Universal Serial Bus 3.1 Specification, Universal Serial Bus 3.0 Specification, and any additions, revisions, and updates thereto.

SUMMARY

Methods and apparatus, including computer program products, are provided for serial communications over a communications control pin.

In some example embodiments, there may be provided a method. The method may include detecting, by a first device including a data interface, a current flow at a first communication control pin at the data interface; and assigning, by the first device based on the detection of the current flow at the first communication control pin, serial data communication circuitry to a second communication control pin at the data interface to carry serial data communications to another device.

In some variations, one or more of the features disclosed herein including the following features can optionally be included in any feasible combination. The data interface may include at least one of a universal serial bus connector and a universal serial bus receptacle. The first communication control pin and the second communication control pin may be coupled to at least pull-down resistor and a ground. The first communication control pin may be coupled to the other device including a pull-up resistor causing the current flow when coupled. The first communication control pin may be located at a first row of the data interface, and wherein the second communication control pin may be located at a second row of the data interface. The detecting may further include identifying the first communication control pin as actively carrying communication control signaling. The assigning may further include selecting the second communication control pin that is not actively carrying communication control signaling to carry the serial data. The first device may detect a current flow at the second communication control pin and assigning, based on the detection of the current flow at the second communication control pin, the serial data communication circuitry to the first communication control pin to carry serial data communications to the other device.

Moreover, there may be provided, in some example embodiments, a method. The method may include detecting, by a device including a data interface having a first communication control pin and a second communication control pin, a current flow at the first communication control pin, the current flow caused by at least a pull-up resistor; and communicating, by the device when the current flow is detected at the first communications pin, serial data via the second communication control pin at the data interface.

In some variations, one or more of the features disclosed herein including the following features can optionally be included in any feasible combination. The data interface may include at least one of a universal serial bus connector and a universal serial bus receptacle. The first communication control pin may be coupled to the other device including a pull-down resistor causing the current flow when coupled. The first communication control pin may be located at a first row of the data interface, and the second communication control pin may be located at a second row of the data interface.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
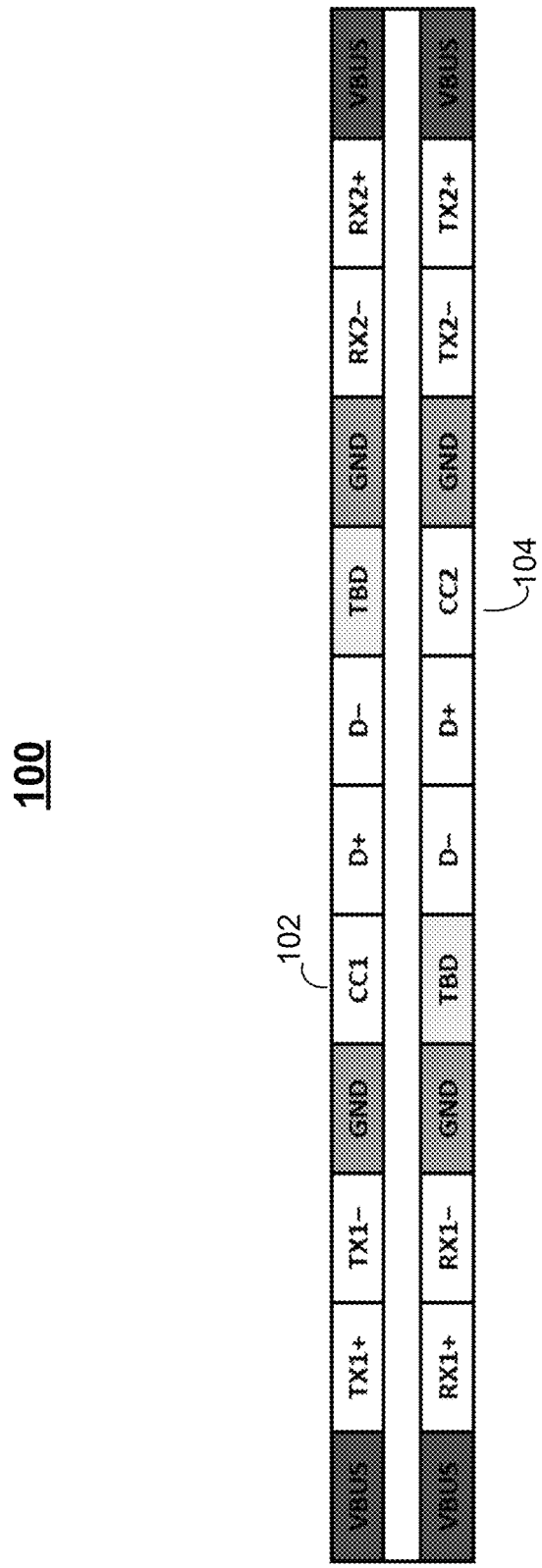
FIG. 1 depicts an example of a data connector.

Like labels are used to refer to same or similar items in the drawings.

DETAILED DESCRIPTION

An example of a data connector is depicted in FIG. 1. The connector may comprise a single, small-sized data connector that can be swapped, so that an end-user does not need to be concerned with the whether the connectors is connected to a host or a slave device or in which way the plug is inserted to the receptacle. The connector may be configured as a universal serial bus (USB) connector, so that either of for example the two USB 3.0 buses can be used to couple to a host device or a slave device. Moreover, the connector can be rotated or twisted. This differs from prior USB connectors having physically different host connectors and slave connectors. The detection of a host or a slave may be performed using Communication Control (CC) signals carried by CC pins or lines. These CC signals may also be used to detect the orientation or direction of the USB connector. The connector (for example, male plugs) may have two CC pins 102 and 104, one in the upper row of the connector 100 and one in the lower row of the connector 100 as shown in FIG. 1. Although both CC pins 102 and 104 can be present, in standard cables only a single CC pin at connector 100 may be connected and wired through the cable and coupled to another device. In accessories with captive cables or directly attached accessories, only one CC-pin may be used for normal CC-detection.

In some example embodiments, the subject matter disclosed herein may relate to detecting which one of the CC pins 102 and 104 is connected and wired through to carry USB communications control (CC) information including communications, signaling, and/or the like. Moreover, once a CC pin is detected, the other unused CC pin may be assigned to carry serial data communications and the like. To illustrate, after a USB connection is made, one of the CC pins 102 may be used for communication control (CC), and the other pin 104 may be re-purposed so that pin 104 can used for simple serial communication between USB devices.

Rather than use two CC pins to detect the orientation of connector 100, a single CC pin may be used and its orientation detected in for example frameworks where a single connection occurs via a captive cable or via accessory attachment directly to a receptacle of a USB-device. Once the active CC pin is detected, the other CC pin (which is not being used for CC) may be re-purposed by for example assigning the other CC pin to carry serial data communication and the like. The active CC-pin may be used to identify a slave/host connection with voltage level changes and may carry Power Delivery (PD) type of communications.

Figure 2:
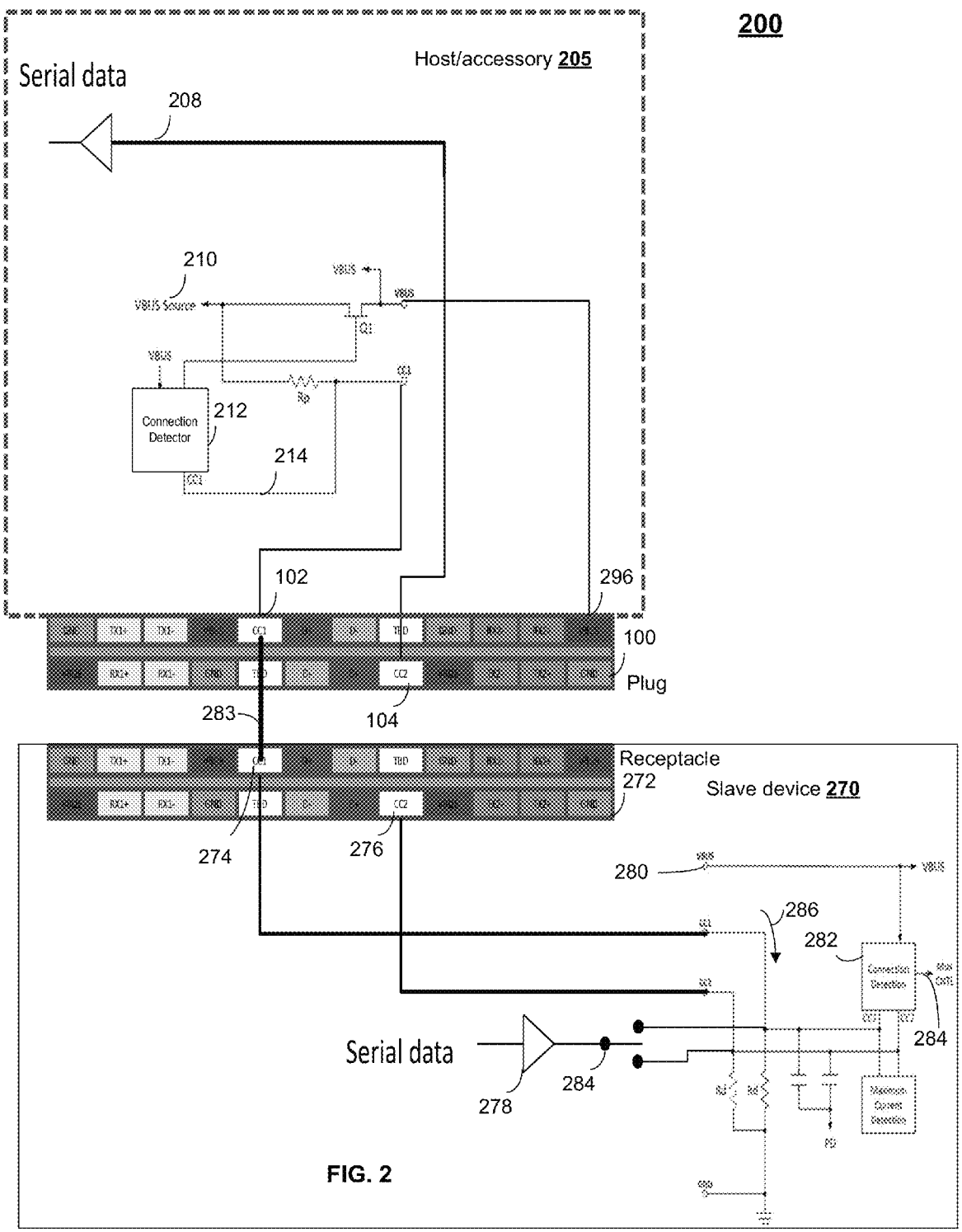
FIG. 2 depicts an example of a system 200 configured to use a communication control pin of a data connector for serial communications, in accordance with some exemplary embodiments.

FIG. 2 depicts an example of a system 200 including a first device 205 having a USB connector 100, such as a male plug, and a second device 270 having a USB connector 272, such as a female receptacle.

The first and second connectors 100 and 272 may be USB connectors (for example, a male plug or a female receptacle) having two rows. The first, top row may include a ground pin (GND), a transmit pin (TX1+), a transmit pin (TX1−), a CC1 pin 102, a D+ pin, a D− pin, and so forth through VBUS pin 296. The bottom row may include a VBUS pin, a receive pin (RX1+), a receive pin (RX1−), and so forth including a CC2 pin 104. Connector 100 is configured so that if the connector is rotated by 180 degrees, the former bottom row (which is rotated to the top row) is compatible with the required pins for the top row.

Although FIGS. 1 and 2 depicts a specific configuration of pins for connectors 100 and 272, other pin configurations may be used as well.

Although some of the examples described herein may refer to USB, USB 3.0, and the like, the subject matter disclosed herein may be used with other types of connectors as well.

In the example of FIG. 2, USB connector 100 may include two CC pins (labeled CC1 102 and CC2 104), a serial data path 208, a source of power (labeled VBUS power source 210), and detection and control circuitry 212 configured to detect which of the two CC pins 102 and 104 carries CC signals.

The second device 270 further includes a USB connector 272, which has the same or similar configuration as connector 100. Connector 272 may also include two CC pins 274 and 276, a serial data path 278, a source of power (labeled VBUS power source 280), and a detection and control circuitry 282.

Detection and control circuitry 212 may be configured to detect which of the two CC pins 102 and 104 carries CC signals. Moreover, detection and control circuitry 212 may be configured to re-purpose the un-used CC pin to carry data after the CC detection process. Detection and control circuitry 212 may also control application of data 208 to CC pin 104. For example, detection and control circuitry 212 may couple data 208 to CC pin 104 on, or after, a valid connection of CC pin 102 is detected at device 270.

According to some embodiments, CC pin 102 may be dedicated to carry CC signals, and CC pin 104 may be dedicated to carrying serial data. As an example, communication control functionality and serial data functionality may be pre-allocated to pins 102 and 104, respectively. Therefore, detection and control circuitry may not need to detect, which of the two CC pins 102 and 104 carries CC signals At device 205, CC pin 102 may be pulled high. In the example of FIG. 2, CC1 pin 102 is pulled high as shown by the coupling to the VBUS power source 210. The phrase "pull up" refers to applying a voltage to a pin, usually through a pull up resistor. In the example of FIG. 2, the CC2 pin 104 is not pulled high but rather connected to a communication path, such as serial data path 208.

Although FIG. 2 depicts a unidirectional data path between 278 and 208, the data path may be unidirectional in the other direction and/or bi-directional as well.

At device 270, both pins 274 and 276 may be pulled down. The pull down refers to applying a voltage (for example, a low voltage, ground, and the like) to a pin usually through a pull down resistor. In the example of FIG. 2, only a single CC pin 102 is connected through connector 274 (but not CC pin 276), so only that single CC pin 102 and coupled CC pin 274 changes voltage due to the pull up and/or pull down. For example, when CC pin 274 and CC pin 102 are coupled, current will flow from 210, 102, 283, 274, and 286, which can be detected by connection detector 282. This makes it possible to detect the polarity of the connectors 100 and 272 at the host device 205 and the slave device 270, although at device 205 the polarity may be known when the plug is integral/directly attached to device 205 or its cable is a captive cable. If plug 100 is inserted into receptacle 272 the other way around (for example, in a twisted orientation), the current will flow from 102 to 276 and pull up/pull down would be detected on the CC2 input of 282. The other CC pins 104 and 276 may be left unused at host device 205 and the slave device 270, although the unused CC pins can be re-purposed (given a connection) by for example assigning the other pins to carry data as disclosed herein.

In some example embodiments, device 205 including detection and control circuitry 212 may first detect the orientation of connector 100 by detecting a change associated with the pull up at CC pin 102. For example, the value of CC1 may be pulled to the value of VBUS 210. But when connector 272 is connected to connector 100, pins CC1 274 and CC2 276 (both of them pulled low as shown by the connection to ground via resistors Rd) will cause a change. This change may be a current draw, voltage change, and/or the like, and this change may be detected by detection and control circuitry 212. For example, the change may cause current to flow from 214, 102, 274, 283, 286, and the like, which can be detected by detection and control circuitry 212.

In some example embodiments, once this detection occurs and thus identity of the active CC pin is detected, device 205 may re-purpose the other pin, such as CC2 pin 104. The re-purposing may include using the CC2 pin to carry data, such as power delivery negotiation communications and any other information.

The device 270 may, as noted, pull down pin CC1 274 and CC2 276 as shown by the connection to ground via resistors Rd. The connection detection and control circuitry 282 may detect which of CC pins 274 and 276 carries CC signaling by detecting for example a current change resulting from the coupling with connector 100. The connection detection and control circuitry 282 may generate a signal 284 to re-purpose the unused pin. For example, the signal 284 may assign data communication to the CC pin not actively being used for CC. Referring to FIG. 2, when CC pin 274 couples to CC pin 102, connection detection and control circuitry 282 may detect a change (for example, a current flow) at 286, and determine that pin 274 is the active CC pin carrying CC signaling. Next, connection detection and control circuitry 282 may issue a control signal 284 to allow data communication 278 to be carried by inactive CC pin 276 coupled to pin 104 and serial data 208.

To further illustrate, device 205 may be implemented as an accessory that can be a USB host and/or a USB slave. Accessory device 205 may have either a captive cable (as in the case of a charger) or a connector (for example, receptacle or plug) built in to accessory device 205 (as in a docking station and the like). This accessory device 205 may also include only a single CC pin 102 assigned to carry CC signaling and further include CC connection detection circuitry 212 with pull up/pull down detection. The other CC pin, such as pin 104, can be re-purposed, as noted, for use as a data path, such as serial data path 208, which can be unidirectional or bidirectional. As such, accessory device 205 may know its configuration with respect to the CC pin 102 and data path 104.

The other device 270 may be implemented as a mobile device (acting as a USB host, USB slave, or both) to which the accessory 205 is connected. The detection circuitry 282 may detect a change (due to the pull up or down) at one of the CC pins 274 or 276. The change enable device 270 to determine the active CC pin being used by accessory device 205. In the example of FIG. 2, the active CC pin being used by accessory device 205 is CC pin 102. In the example of FIG. 2, the unused CC pin 104/276 can be disconnected from CC communications and/or re-repurposed for other uses, such as serial communication between the device and accessory.

Figure 3:
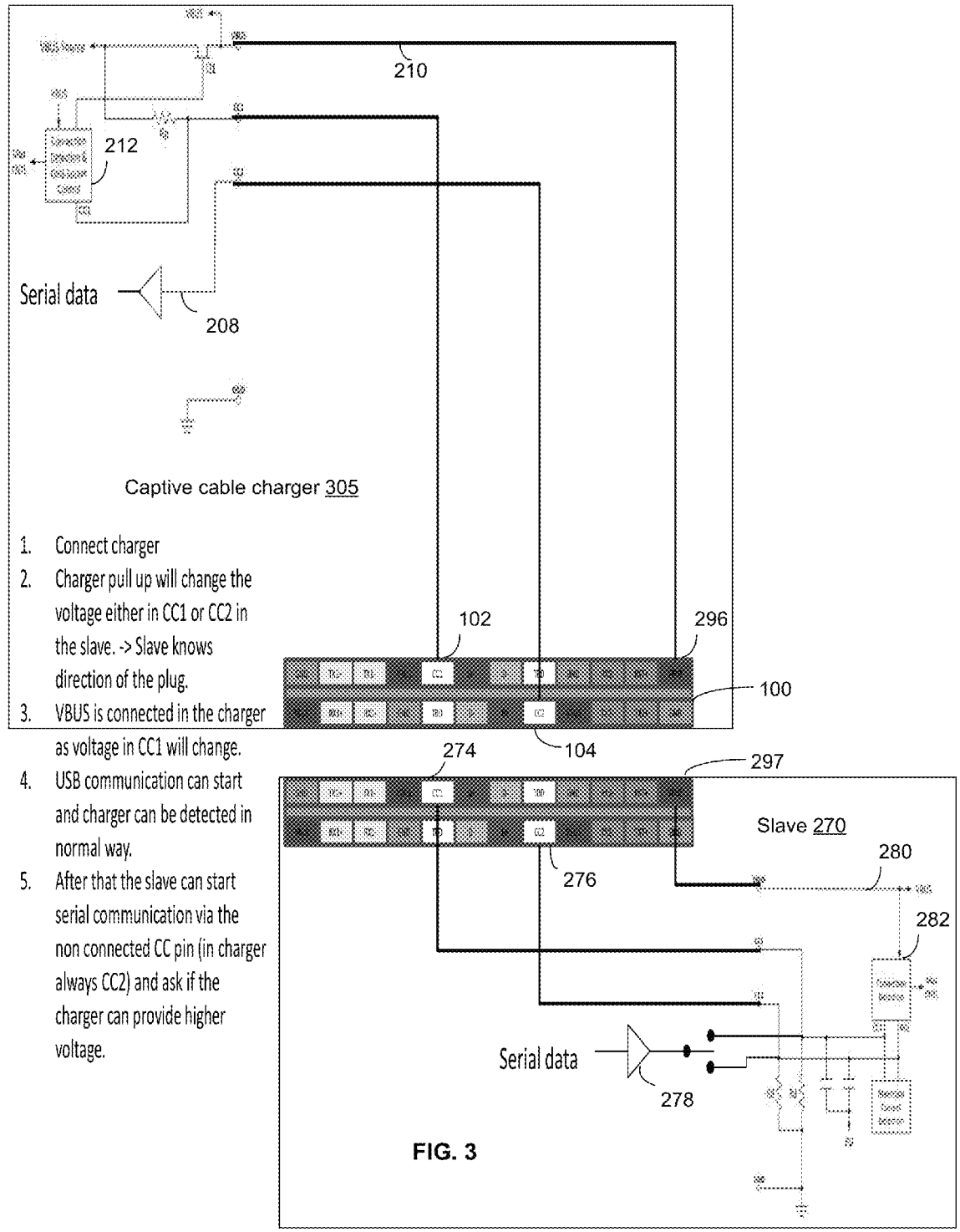
FIG. 3 depicts an example of a system 300 including a charger and a host configured to use a communication control pin of a data connector for serial communications, in accordance with some exemplary embodiments.

FIG. 3 depicts another example of system 300 including a device 305, such as a charger having a captive cable through which power can be provided to device 270 (labeled slave device).

In the example of FIG. 3, the charger 305 may be coupled to slave device 270. When charger 305 couples to device 270, the pull up at CC pin 102 will pull up either CC pin 274 or CC pin 276. For example, in the orientation shown at FIG. 3, CC pin 274 would be affected by the pull up at pin 102. This may be detected by detector 282, as noted. If however, the orientation of connector 100 is rotated by 180 degrees, CC pin 276 would be affected by the pull up at pin 102. In either case, slave device detect the orientation of the connector 100 including the location of the active CC pin. In the example of FIG. 3, when detector 212 detects the change (for example, a current flow), the detector 282 may connect the VBUS 210 (for example, detector 212 may switch Q1 on or off) to pin 296. USB communications with shorted D+/D− pins may proceed, and the charger can be detected by the slave 270. Next, the slave 270 may switch at 278 to couple serial data to the inactive/unused CC pin, which in the example of FIG. 3 corresponds to CC pin 276, which is further coupled to CC pin 104 and the like. For example, the serial data carried by CC pin 276 may request charger 305 to provide a higher charging voltage.

Figure 4:
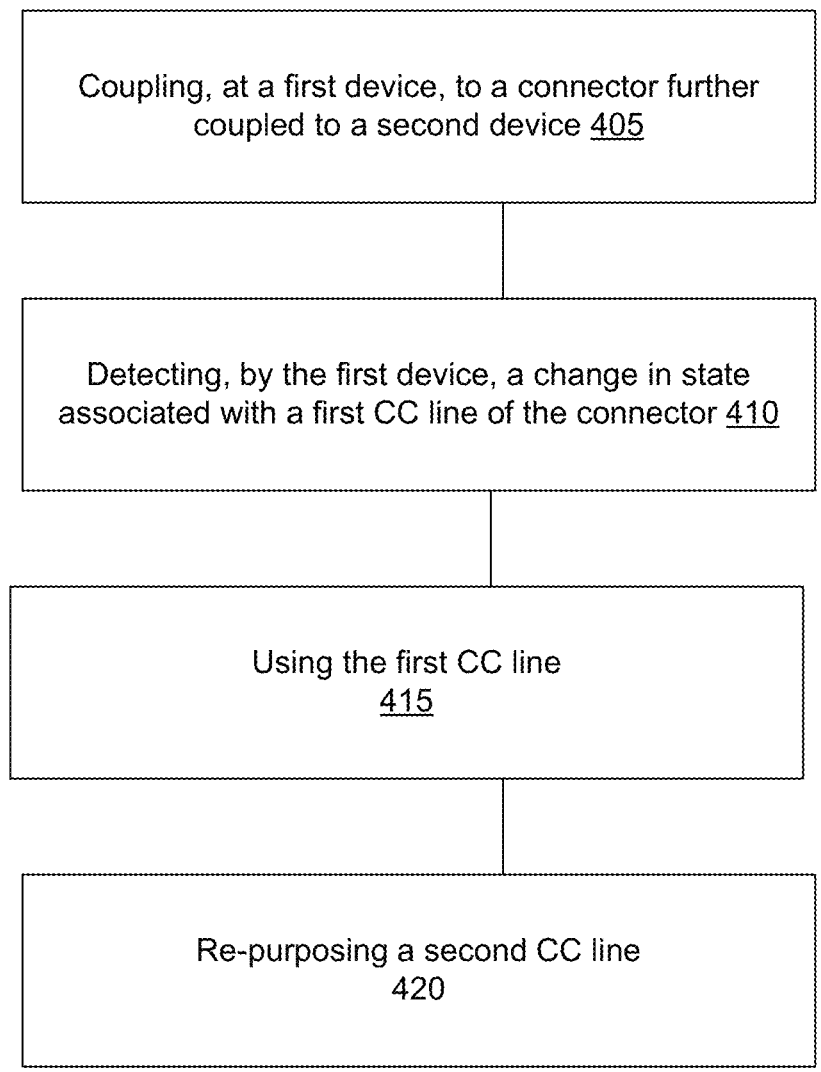
FIG. 4 depicts an example of a process 400 for detecting an active communication control pin and assigning another communication control pin to carry serial data communications, in accordance with some example embodiments.

FIG. 4 depicts an example of a process for detecting an active communication control pin and assigning another communication control pin to carry serial data communications, in accordance with some example embodiments. The description of FIG. 4 also refers to FIG. 2.

At 405, a first device may be coupled to a second device, in accordance with some example embodiments. For example, device 205 may have only a single CC1 line active and coupled at 102 to connector 100 and a second CC2 pin 104 coupled to serial data. This connector 100 may be coupled to connector 272 at device 270. The coupling may be direct, such as connector 100 plugging into 272 directly or indirectly via cables and/or mating receptacles.

At 410, a change in state associated with one of the CC lines may be detected, in accordance with some example embodiments. For example, device 270 may detect a current flow 286 associated with CC1 102 (which has been pulled up via resistor, Rp, and VBUS source 210) and the pull down of CC1 276 via resistor, Rd, and ground. This current flow may be detected by circuitry 282 and used to determine the orientation of connector 100 and the location of the CC1 pin 102/274. These CC1 pins 102/274 may then be used, at 415, for communications control over the USB bus. The CC-pin (s) may be used to detect that something is plugged in and used to distinguishing which side is the host device 205 and which side is the slave device 270, after which normal USB communication or charging begin.

At 420, the unused CC pin, such as pins 104/276 at the FIG. 2 example, may be re-purposed to carry for example data communications, in accordance with some example embodiments. For example, circuitry 282 may send a control signal 284 to select which CC pin 274 or 276 is not being used for CC purposes. In the example of FIG. 2, the control signal 284 select CC pin 276, which allows device 270 to receive data 208 from device 205.

Figure 5:
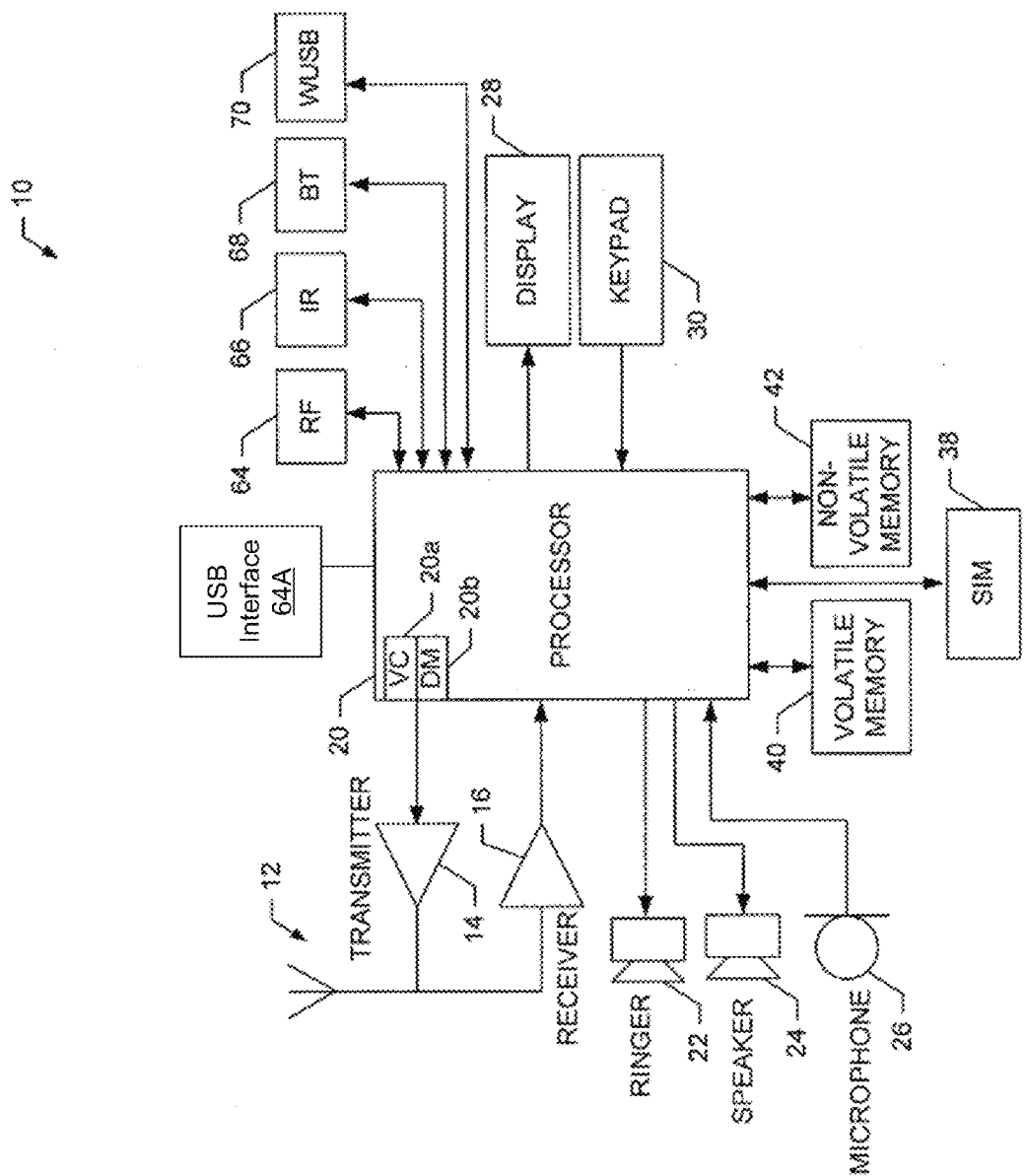
FIG. 5 depicts an example of an apparatus, in accordance with some example embodiments.

FIG. 5 illustrates a block diagram of an apparatus 10, which can be configured as user equipment, in accordance with some example embodiments. The apparatus 10 may further include a USB interface 64A, which may include one or more of the aspects described with respect to FIG. 4 and the like, such as the orientation detection and control circuitry, re-purposing of CC pins, and the like.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein with respect to the user equipment, such as for example the functions disclosed at process 400. The memories may comprise an identifier, such as for example, an international mobile equipment identification (IMEI) code, capable of uniquely identifying apparatus 10. In the example embodiment, the processor 20 may be configured using computer code stored at memory 40 and/or 42 to provide one or more operations described with respect to process 400, FIG. 2, FIG. 3, and/or the like as disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example a computer or data processor circuitry, with examples depicted at FIG. 5 and the like. A computer-readable medium may comprise a non-transitory computer-readable storage medium that may be any media that can contain or store the instructions for use by or in connection with an instruction execution system, apparatus, or device, such as for example a computer. Furthermore, some of the embodiments disclosed herein include computer programs configured to cause methods as disclosed herein (see, for example, process 400 and/or the like).

Without in any way limiting the scope, interpretation, or application of the claims appearing below, a technical effect of one or more of the example embodiments disclosed herein is a simple serial communication can be established between USB-device and accessory without the need to implement full power delivery (PD) communication. Moreover, without in any way limiting the scope, interpretation, or application of the claims appearing below, another technical effect of one or more of the example embodiments disclosed herein is reduction in the need for extra pins in the connector as unused CC-pins can be used for communications.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
    detecting, by a first device including a data interface, a current flow at a first communication control pin at the data interface, wherein the first communication control pin and a second communication control pin are configured to at least enable detection of an orientation of a connector by at least detecting the current flow; and
    assigning, by the first device based on the detection of the current flow at the first communication control pin, serial data communication circuitry to the second communication control pin at the data interface to carry serial data communications to another device.

2. The method of claim 1, wherein the data interface comprises at least one of a universal serial bus connector and a universal serial bus receptacle.

3. The method of claim 1, wherein the first communication control pin and the second communication control pin are coupled to at least pull-down resistor and a ground.

4. The method of claim 3, wherein the first communication control pin is coupled to the other device including a pull-up resistor causing the current flow when coupled.

5. The method of claim 1, wherein the first communication control pin is located at a first row of the data interface, and wherein the second communication control pin is located at a second row of the data interface.

6. The method of claim 1, wherein the detecting further comprises identifying the first communication control pin as actively carrying communication control signaling, and wherein the assigning further comprises selecting the second communication control pin that is not actively carrying communication control signaling to carry the serial data.

7. The method of claim 1, further comprising:
    detecting, by the first device, a current flow at the second communication control pin; and
    assigning, by the first device based on the detection of the current flow at the second communication control pin, the serial data communication circuitry to the first communication control pin to carry serial data communications to the other device.

8. An apparatus comprising:
    a data interface including a first communication control pin and a second communication control pin, the first communication control pin and a second communication control pin coupled to a pull-down resistor;
    detection circuitry to detect a current flow at the first communication control pin, wherein the first communication control pin and the second communication control pin are configured to at least enable detection of an orientation of a connector by at least detecting the current flow; and
    control circuitry to assign, based on the detection of the current flow at the first communication control pin, serial data communication circuitry to the second communication control pin to enable serial data communications between the apparatus and another device.

9. The apparatus of claim 8, wherein the data interface comprises at least one of a universal serial bus connector and a universal serial bus receptacle.

10. The apparatus of claim 8, wherein the first communication control pin is coupled to the other device including a pull-up resistor causing the current flow when coupled.

11. The apparatus of claim 8, wherein the first communication control pin is located at a first row of the data interface, and wherein the second communication control pin is located at a second row of the data interface.

12. The apparatus of claim 8, wherein the detection circuitry identifies the first communication control pin as actively carrying communication control signaling, and wherein the control circuitry selects the second communication control pin that is not actively carrying communication control signaling to carry the serial data.

13. The apparatus of claim 8, wherein the detection circuitry is configured to
detect a current flow at the second communication control pin, and wherein the control circuitry is configured to assign, based on the detection of current flow the second communication control pin, the serial data communication circuitry to the first communication control pin at the data interface to carry serial data communications between the apparatus and the other device.

14. An apparatus comprising:
a data interface including a first communication control pin and a second communication control pin, the first communication control pin coupled to a pull-up resistor and a source of power;
detection circuitry to detect a current flow at the first communication control pin, wherein the first communication control pin and the second communication control pin are configured to at least enable detection of an orientation of a connector by at least detecting the current flow; and
a serial data interface coupled the second communication control pin, the serial data interface allowed to send serial data via the second communication control pin after the detected current flow at the first communication control pin.

15. The apparatus of claim 13, wherein the data interface comprises at least one of a universal serial bus connector and a universal serial bus receptacle.

16. The apparatus of claim 13, wherein the first communication control pin is coupled to the other device including a pull-down resistor causing the current flow when coupled.

17. The apparatus of claim 13, wherein the first communication control pin is located at a first row of the data interface, and wherein the second communication control pin is located at a second row of the data interface.

18. A method comprising:
detecting, by a device including a data interface having a first communication control pin and a second communication control pin, a current flow at the first communication control pin, the current flow caused by at least a pull-up resistor and a source of power, wherein the first communication control pin and a second communication control pin are configured to at least enable detection of an orientation of a connector by at least detecting the current flow; and
communicating, by the device when the current flow is detected at the first communications pin, serial data via the second communication control pin at the data interface.

19. The method of claim 18, wherein the data interface comprises at least one of a universal serial bus connector and a universal serial bus receptacle.

20. The method of claim 18, wherein the first communication control pin is coupled to the other device including a pull-down resistor causing the current flow when coupled.

21. The method of claim 18, wherein the first communication control pin is located at a first row of the data interface, and wherein the second communication control pin is located at a second row of the data interface.

22. A non-transitory computer-readable storage medium including computer program code which when executed by at least one processor circuitry causes operations comprising:
detecting, by a first device including a data interface, a current flow at a first communication control pin at the data interface, wherein the first communication control pin and a second communication control pin are configured to at least enable detection of an orientation of a connector by at least detecting the current flow; and
assigning, by the first device based on the detection of the current flow at the first communication control pin, serial data communication circuitry to a second communication control pin at the data interface to carry serial data communications to another device.

23. A non-transitory computer-readable storage medium including computer program code which when executed by at least one processor circuitry causes operations comprising:
detecting, by a device including a data interface having a first communication control pin and a second communication control pin, a current flow at the first communication control pin, the current flow caused by at least a pull-up resistor and a source of power, wherein the first communication control pin and the second communication control pin are configured to at least enable detection of an orientation of a connector by at least detecting the current flow; and
communicating, by the device when the current flow is detected at the first communications pin, serial data via the second communication control pin at the data interface.

* * * * *